Figure 1:
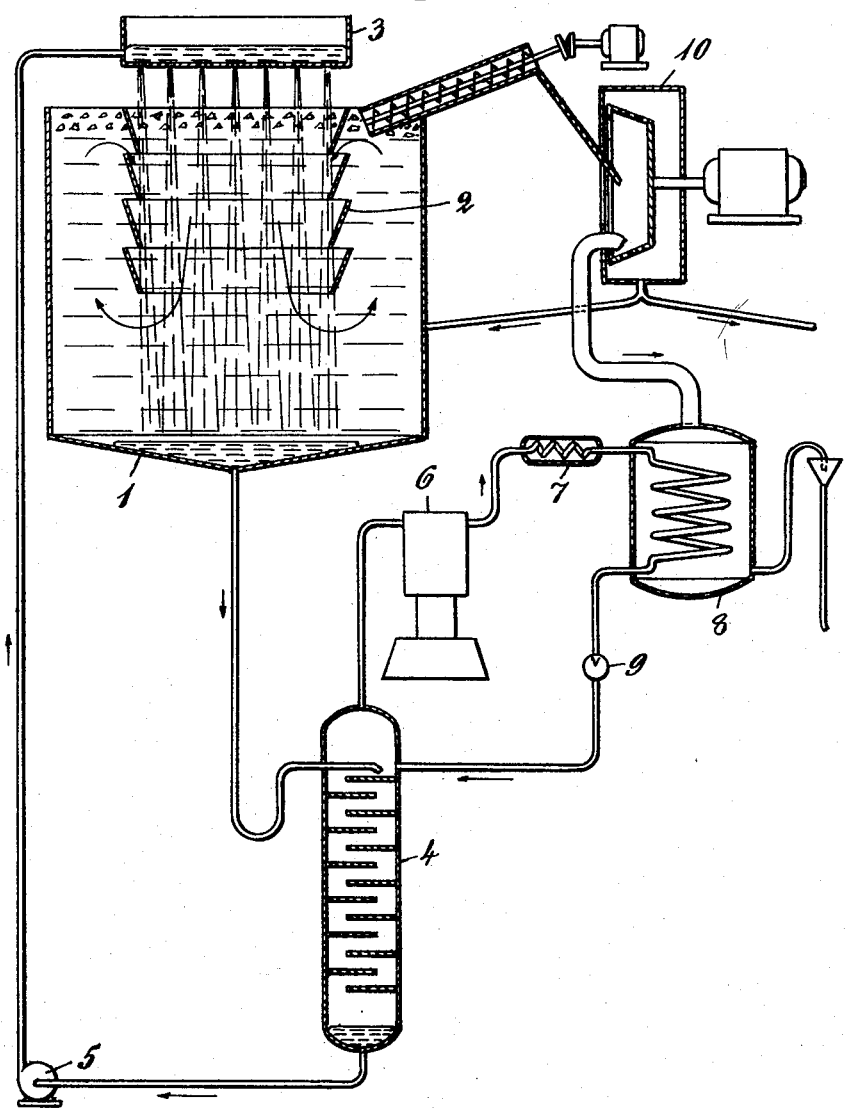

Patented Jan. 19, 1954

2,666,304

UNITED STATES PATENT OFFICE 2,666,304

PROCESS FOR CONCENTRATING BY FREEZING

Per Johan Ingemar Ahrel, Sallinge, Sweden

Application April 18, 1951, Serial No. 221,698

7 Claims. (Cl. 62—170)

It is known in the art to concentrate dilute solutions by freezing out some one of the components of the solution. When large quantities of solvent shall be removed in this way by freezing out, as, for instance, in concentrating sea water, waste cellulose liquors, etc., large and expensive cooling surfaces are required, which easily become coated by frozen solvent, so that the efficiency will be impeded. It has been suggested, for dispensing with cooling surfaces, to freeze out the solvent by means of a liquid having a low boiling temperature, which has been boiled off in contact with the solution. Among the cooling media which may be employed in such a process, carbon dioxide is probably the best one as it is cheap and, at the same time, not too soluble in the solvent most commonly used, viz. water. From practical reasons the freezing process proper should be carried out and at atmospheric pressure, at least in a continuous process. In case the solvent is water, the freezing takes place near 0° C., at least in dilute solutions. Under these conditions, however, the carbon dioxide, as is well known, is a cooling medium involving an essentially greater power consumption than, for instance, ammonia. Having a great solubility, particularly in water, ammonia, however, can not with advantage be boiled off in direct contact with the solution.

According to the present invention you cool, instead, mercury with boiling cooling medium and, thereafter cool the solution by bringing it in direct contact with the mercury. Although the cooling surface is here a liquid surface there is, nevertheless, a risk that a layer of frozen solvent is formed on the cooling surface and will impede the heat transmission. In order to avoid this and provide an improved heat transmission the mercury is, according to the invention, kept in motion.

According to the invention this can be carried out in different ways.

One mode is to subject the mercury to pulsations, whereby surges are created on the surface of the mercury. These surges serve, on the one hand, to loosen and remove frozen solvent from the surface and, on the other hand, to improve the heat transmission. Wave lengths of the order of up to a few centimeters are most suitable, corresponding to numbers of pulsation exceeding about 2 per second, preferably at least 40 per second.

As an example the pulsations may be brought about by a vibrator working at normal line frequency. The pulsations are, according to the invention, also useful inasmuch as they cause a stirring of the solution, so that frozen out crystals of the solvent are removed from the immediate vicinity of the cooling surface and concentrating of the solution near the cooling surface will be simultaneously prevented.

In some cases it is advantageous, according to the invention, to subject the mercury to pulsations of at least 2 different frequencies, one of which forming in the mercury surgings having a wave length of the same order as the thickness of the laminar layer which should be formed in stagnant mercury in the border layer of the solution against the mercury and which should have impeded the heat transmission; and one of which forming in the mercury surgings of a wave length suited to cause stirring of the bulk of the solution.

It may also be advantageous to combine surgings caused by pulsations with some other, e. g. mechanical stirring of the solution and/or the mercury. In order to avoid pumping of the mercury between the evaporator of the cooling equipment and the freezing place the process may, according to the invention, be carried out in such manner that the mercury is simultaneously in direct contact with the solution and the evaporator. This can be attained by providing a mercury layer between the solution and the evaporator of the cooling unit in direct contact with both of them. In this case it may be particularly adequate to make the evaporator of the cooling equipment the bottom of the freezing container or to give it the shape of a plate submerged into a mercury layer of the freezing container. The pulsations brought about as above in the mercury will also favour the heat transmission from the mercury to the evaporator. If the evaporator is a plate which is in contact with the mercury also on its lower side, the cooling of the mercury is highly increased if it is circulated between the upper and lower sides of the plate. The most efficacious cooling of the mercury is obtained at the lower side of the evaporator since the boiling cooling medium lies at the bottom of the evaporator, partly isolated from the upper side of the evaporator by the evaporated vapour. The circulation may with advantage be carried out with a propeller or membrane pump. The evaporator should be so performed, in a manner known per se, as to expose as great a heat transmission surface as possible.

The pulsations of the mercury are preferably brought about by movable membranes in the bottom of the freezing container or in separate recesses in the evaporator.

If the evaporator is submerged as above in the mercury one or more such membranes may by pulsations simultaneously give rise to surgings in the cooling surface and circulate mercury between the upper and lower sides of the plate.

The most efficacious cooling of the mercury is obtained if according to another embodiment of the invention the cooling medium is boiled off in direct contact with the mercury. This may be carried out, for instance, by passing the cooling medium through a mercury bath or by passing the cooling medium and the mercury through a column apparatus. If, for instance, in the manner just described, the mercury is cooled outside the freezing container it is possible to counteract also in another way than by surging the disadvantages of ice formation at the cooling surface described in the preamble.

Such a method is to pass the cooled mercury in the form of drops or jets through the solution. The mercury may in this case be distributed, for instance, by passing it through a false bottom or in some other way. Particularly if a false bottom is used it is necessary to protect the latter from solvent being frozen thereon. This is best attained by placing the false bottom above the solution and not in contact therewith. If for some reason or other, for instance for the risk of foaming, it is desirable to have the distribution member for the mercury submerged in the liquid, it is advantageous to remove the ice by scraping or heating.

What has been said above about causing the cooling surface to surge by means of pulsations holds, of course, also good if the pulsations are supplied to the system through the solution.

In concentrating the solution according to the invention it may in many cases be advantageous to operate in a plurality of steps as is known per se. Thereby, the most concentrated solution is obtained in one or some of the steps and in the other steps the difficulties consequential to a high concentration may be escaped.

If the substance dissolved causes a great depression of freezing point it may be advantageous to let the solution as well as the mercury pass the steps in series countercurrently. Thereby the mercury is utilized for cooling at different temperatures. If desired, a certain cooling of the mercury may be carried out between the steps.

The solvent frozen out is preferably freed from mother liquor, charge wise or continuously, by pressing, filtering, drainage and/or centrifugation or in any other known manner. The solid component may then be washed by claying or bottoming in a manner known per se.

The solvent frozen out can be separated in the freezing container and removed therefrom more or less perfectly separated from mother liquor. It may also be removed, particularly in multistep processes, together with a large quantity of mother liquor, possibly with the entire quantity, and be separated from all of the liquor in a special separator.

The solvent frozen out can with advantage be used for the condensation of cooling medium in the condenser of the cooling equipment.

If the solution to be concentrated has a corroding influence upon the mercury the latter may be protected by charging it with an adequate electric voltage relative to the solution, a so-called protective potential.

Some embodiments applied to concentrating sea water will now be described with reference to the attached drawings illustrating two different flow sheets.

Figure 2:
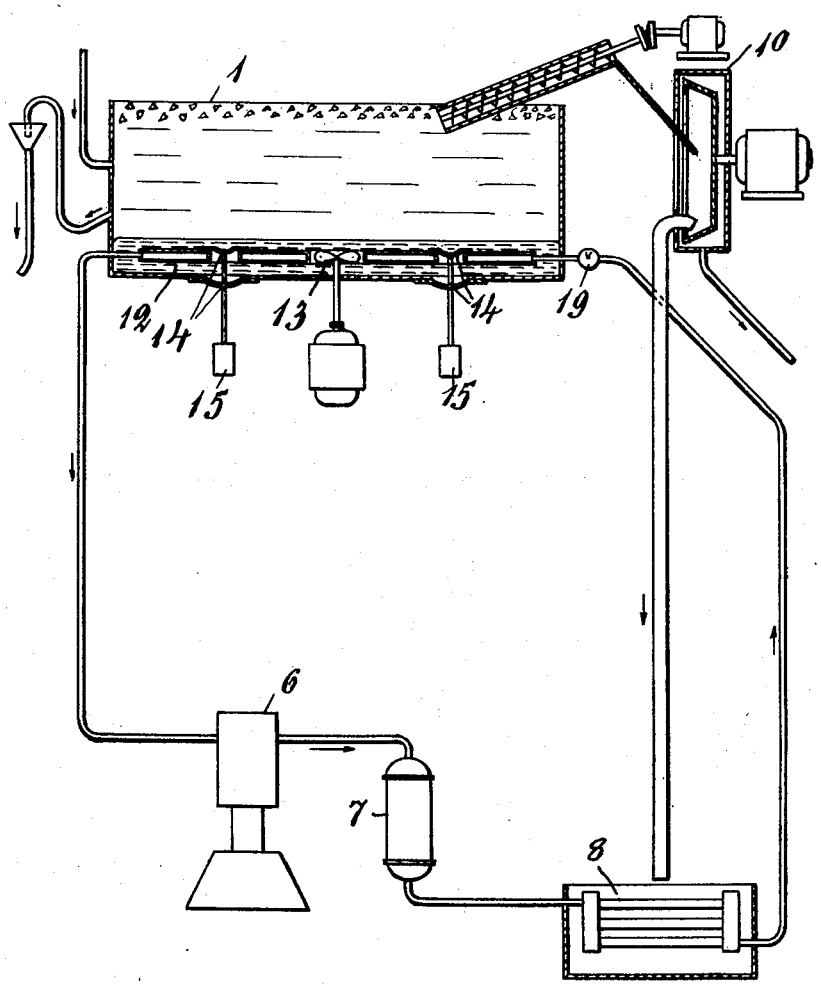

In the drawing:

Fig. 1 illustrates the flow sheet in case the mercury is caused to pass the solution to be cooled in the form of drops or jets, and Fig. 2 illustrates the flow sheet for an arrangement with surging mercury.

According to Fig. 1 the sea water is supplied to the freezing container 1 which is subdivided by three partitions. The middle partition is separated from the other ones by two openworked plate screens 2. The cooled mercury is introduced into the distribution box 3 having a perforated bottom and being located above the liquid surface. The mercury flows through the perforations down into the solution and absorbs on the way heat from the solution. The mercury collects in the lower part of the freezing container and due to the hydrostatic pressure flows from there into the evaporator 4. Here the mercury flows over a number of bottoms or shelves in parallel to flowing boiling liquid ammonia which thus takes up the heat from the mercury. The cooled mercury is collected in the lower part of the evaporator and is pumped via the pump 5 back to the distribution box 3. The evaporated ammonia leaves the evaporator at the top thereof and is passed to the compressor 6 to be compressed. The compressed vapour is condensed by first being cooled in the pre-cooler 7 by water and thereafter in the condenser 8 by means of ice which has been frozen and separated in the plant. The liquid ammonia is returned to the evaporator 4 through the reducing valve 9.

The sea water in the freezing container is brought into circulation in such way by the mercury flowing downwards as to pass downwards in the middle partition and upwards in the outer one. The shutter-like screens act partly as separators to the effect that the larger ice crystals flow up to the surface of the outer partition and the smaller crystals are sucked back into the central partition to act as crystallization nucleus in the freezing process.

The ice sludge formed in the freezing container 1 is conveyed to the continuously working centrifugal machine 10 where ice and mother liquor are separated. The ice is removed to the condenser 8, while the mother liquor is partly returned to the freezing container 1. One portion is discharged from the system as ready concentrated solution.

In the method according to Fig. 2 the mercury is kept at the bottom of the freezing container 1. The evaporator 12 is submerged in the mercury and may consist of tube coils, provided or not provided with cooling flanges, a plate having bored channels, a welded box or the like. The mercury is circulated between the upper and lower sides of the evaporator by means of the propeller pump 13. The border surface of the mercury against the solution is subjected to surgings by the aid of vibrating diaphragms 14, the vibrations of which are brought about by means of the electro-magnetic vibrators 15 or other vibration producing means. Liquid ammonia is supplied to the evaporator and evaporated therein under cooling of the mercury. The ammonia vapour is passed to the compressor 6 where it is compressed. It is then cooled in the pre-cooler 7 and condensed by means of melting ice in the condenser 8. From the latter the ammonia, now liquid, is returned to the evaporator 2 via the reducing valve 19.

The ice sludge formed in the freezing container is discharged and introduced in the continuous centrifugal machine 10. Here the ice is separated from the mother liquor and passed to the condenser 8. A portion of the mother liquor is returned to the freezing container 1 while the remainder is discharged as ready concentrated solution.

It has been found that in the concentrating process, particularly in concentrating sulphite liquor, small drops of mercury will easily be formed which do not coalesce to form a homogeneous mercury phase. In some cases the drops are so small as to be invisible with the bare eye. The reason for this phenomenon may in some cases be the fact that the mercury has become oxidized. The surfaces of the individual drops are then coated by an extremely thin oxide layer invisible to the bare eye. In some cases the efficiency of the oxidation is increased by the fact that the solution between the drops, particularly at relatively high concentrations, form extremely thin but stable layers separating the drops from each other. This is particularly pronounced in solutions containing organic matter of high molecule weight.

For eliminating this drawbacks different remedies have been tried. The method referred to above to charge the mercury with a protecting potential is not always sufficient. According to one embodiment of the invention some improvement will be obtained if the protecting potential is given the form of a varying voltage, either a pulsating direct current voltage or an alternating current voltage superimposing direct current voltage.

Another method according to this invention, which has been found most simple and efficacious, is to replace the mercury by amalgam containing a low percentage of a hydrogen displacing metal, preferably an alkaline metal, such as sodium. This addition prevents the oxidation of the mercury. Moreover, the decomposition of the amalgam at the surfaces of the mercury drops seems to facilitate the breaking up of the extremely thin coats of viscous solution which in case of relatively concentrated organic solutions may prevent the hydrogen drops from coalescing.

As a rule very small additions of amalgam to the mercury have been required. At the final concentrating of sulphite liquor of concentrations from 30% and more considerable quantities of the order of 1 gram sodium per 10 kilograms ice formed have been required. The cost for this large quantities is, however, not deterrent, particularly inasmuch as in concentrating sulphite liquor the majority of the water is already removed when a concentration of 30% is attained.

The addition of amalgam can be carried out by incorporating in the mercury amalgam separately prepared with a higher alkali metal concentration than that desired. In large commercial plants it is probably the most cheap way to circulate a portion of the mercury from the freezing apparatus continuously to and through an electrolytic cell, where the mercury is amalgamated through electrolysis of a solution containing a composition of the hydrogen deplacing metal.

In the case of sodium amalgam a concentration of sodium has in one case, when sulphite liquor was concentrated, been 0.001%.

Instead of sodium potassium or in some cases even magnesium or calcium may be used.

The surging of the mercury surface can be obtained simply by stirring of the mercury or, with advantage, of the solution so that the mercury surface will be kept in motion.

What I claim is:

1. Process for concentrating a solution of at least one substance comprising establishing a continuous bulk of said solution, bringing a quantity of mercury containing an amalgam of a hydrogen displacing metal into contact with said solution, keeping said mercury in movement when in contact with said solution, cooling said mercury so as to bring portions of said solution to a temperature below its freezing point, and removing substance frozen out from said solution as a result of said cooling.

2. Process as claimed in claim 1 in which said hydrogen displacing metal is at least one metal of the group of base-forming metals consisting of sodium, potassium, magnesium and calcium.

3. Process as claimed in claim 1 in which the percentage of the hydrogen displacing metal in the mercury is of the order 0.001%.

4. Process for concentrating an aqueous solution of at least one substance comprising establishing a continuous bulk of said solution, bringing a quantity of mercury containing an amalgam of a hydrogen displacing metal into contact with said solution, keeping said mercury in movement when in contact with said solution, cooling said mercury so as to bring portions of said solution to a temperature below its freezing point, and removing substance frozen out from said solution as a result of said cooling.

5. Process for concentrating a solution of at least one substance in a liquid solvent, comprising establishing a continuous body of said solution, passing substantially pure mercury into contact at a cooling station with a liquid cooling medium having a boiling point below the freezing point of said solution and evaporating said medium so as to cool said mercury to a temperature below the freezing point of said solution, subdividing said cooled mercury into a plurality of streams in the atmosphere over the surface of said solution body and letting the streams pass through the solution, collecting the mercury passed through and returning it to said cooling station for repeated cooling.

6. Process as claimed in claim 5 in which said liquid cooling medium is ammonia.

7. Process for concentrating a solution of at least one substance in a liquid solvent, comprising establishing a continuous body of said solution, passing substantially pure mercury into contact at a cooling station with a liquid cooling medium having a boiling point below the freezing point of said solution and evaporating said medium so as to cool said mercury to a temperature below the freezing point of said solution, passing the cooled mercury through said solution in direct contact therewith, returning it to said cooling station for repeated cooling, removing the solid phase of the solvent frozen out as a result of the passage of said cooled mercury through the solution, subjecting the evaporated cooling medium to compression and cooling so as to condense it, said cooling being carried out by using the melting heat of said removed solid phase, and returning the condensed cooling medium to said cooling station.

PER JOHAN INGEMAR AHREL.

References Cited in the file of this patent

UNITED STATES PATENTS

| Number | Name | Date |
|---|---|---|
| 1,905,185 | Morris | Apr. 25, 1933 |
| 1,969,187 | Schutt | Aug. 7, 1934 |

FOREIGN PATENTS

| Number | Country | Date |
|---|---|---|
| 178,013 | Switzerland | Sept. 2, 1935 |